United States Patent [19]
Firth et al.

[11] 3,971,217
[45] July 27, 1976

[54] RECIPROCATABLE DEVICES

[75] Inventors: Donald Firth, Glasgow, Scotland; Keith Foster; Christopher John Hooke, both of Birmingham, England

[73] Assignee: The Secretary of State for Trade and Industry in Her Britannic Majesty's Government of the United Kingdom of Great Britain and Northern Ireland, London, England

[22] Filed: Oct. 3, 1974

[21] Appl. No.: 511,523

Related U.S. Application Data

[62] Division of Ser. No. 299,178, Oct. 19, 1972, abandoned.

[30] Foreign Application Priority Data
Aug. 4, 1972 United Kingdom............... 36447/72

[52] U.S. Cl................................. 60/486; 60/494; 91/218; 91/339; 92/129
[51] Int. Cl.²..................... F15B 13/09; F15B 15/04
[58] Field of Search............ 92/129, 130 B, 130 R, 92/137, 249, 89, 90; 91/218, 339; 60/486, 533, 594, 698

[56] References Cited
UNITED STATES PATENTS

| | | | |
|---|---|---|---|
| 2,132,730 | 10/1938 | Geyer | 92/105 X |
| 2,310,519 | 2/1943 | Eskin | 92/90 X |
| 2,354,958 | 8/1944 | Loweke | 92/105 X |
| 2,365,752 | 12/1944 | Edwards | 137/DIG. 4 |
| 2,664,673 | 1/1954 | Devorss, Jr. | 92/105 X |
| 2,791,969 | 5/1957 | Berliner | 92/94 X |
| 2,973,644 | 3/1961 | Greenawalt | 92/94 X |
| 3,200,757 | 8/1965 | Steffes | 92/94 X |
| 3,338,321 | 8/1967 | Pomeroy | 175/92 |
| 3,523,001 | 8/1970 | Sylvester | 92/177 X |

FOREIGN PATENTS OR APPLICATIONS

| | | |
|---|---|---|
| 348,013 | 4/1931 | United Kingdom |
| 1,041,252 | 9/1966 | United Kingdom |
| 1,111,152 | 4/1968 | United Kingdom |
| 1,111,153 | 4/1968 | United Kingdom |
| 495,563 | 1/1938 | United Kingdom........... 92/105 |

*Primary Examiner*—Edgar W. Geoghegan
*Attorney, Agent, or Firm*—Stevens, Davis, Miller & Mosher

[57] ABSTRACT

A fluid operated reciprocatable device has an outer, usually fixed, member and an inner relatively movable member joined by a resilient member e.g., of rubber. The outer member is closed at one end so as to form an enclosure into which fluid under pressure can be admitted so as to displace the inner member in a given axial direction relative to the outer member. When a pulsating pressure is applied to the fluid the inner member vibrates axially in accordance with the pulses. The resilient member is proportioned so that its dimension in the axial direction is large in comparison with the thickness between the outer and inner members, e.g. 4 times larger. The properties of the resilient member are chosen so that it acts not only as a seal between the outer and inner members to contain fluid, but as a return spring whereby the inner member is returned, between fluid pulses, from an axially displaced position.

8 Claims, 10 Drawing Figures

RECIPROCATABLE DEVICES

This is a division of application Ser. No. 299,178, filed Oct. 19, 1972, now abandoned.

This invention relates to reciprocatable devices of the kind in which one member of a device is reciprocated in relation to another by the application between them of a varying fluid pressure; or in which, conversely, reciprocating motion is used to displace fluid.

Reciprocating devices of the above mentioned kind have usually comprised a cylinder with a piston fitting closely within it. If a seal between the members is to be effective, especially at high fluid pressure, manufacture of such a device involves high precision processes and is correspondingly expensive. Moreover, the quality of the seal can easily become impaired in use by the accidental presence of abrasive particles in the fluid, which particles may damage the coacting surfaces of the piston and cylinder.

For some purposes, designs have been evolved in which the piston does not make contact with the cylinder, but only with a packing ring or the like where the piston passes into the cylinder. However, the piston is still subject to wear due to abrasion between it and the packing.

Rubbing friction between piston and cylinder has been eliminated in a construction in which the members are connected together by a flexible diaphragm; but these devices are generally unsuitable for conditions in which the pressure difference across the diaphragm can exceed about 0.5 $MN/m^2$. The usual kind of hydraulic system, such as is common in earth cutting and earth moving machinery requires pressure differences about 30 times greater than that just quoted.

The present invention eliminates wear due to rubbing friction in a reciprocatable device and at the same time allows the employment of a much higher fluid pressure difference than can be used with the conventional flexible diaphragm device.

According to the invention a reciprocatable device comprises an outer member, an inner member which can be reciprocated relative to the outer member in a given axial direction, and a resilient member connecting said outer and inner members so as to form a seal between them, and an end of the outer member forming an enclosure which can contain pressurized fluid through which force can be applied to the inner member to move said inner member in said axial direction relative to the outer member while flexing the resilient member, the average thickness of the resilient member in a direction normal to the axial direction being not greater, preferably considerably less, than the average length of said resilient member in the axial direction.

The thickness of the resilient member may be in the range one half to one sixth of the length thereof and desirably about one third to one quarter.

The resilient member preferably flexes sufficiently when displaced to act as a return spring urging the inner member towards its undisplaced position in relation to the outer member.

In one optional form the reciprocatable device includes a piston which is a close sliding fit in the end of the outer member forming an enclosure, said piston being arranged so that it can apply force from pressurized fluid when in the enclosure to the inner member of the device.

The device may have a circular cross section normal to the said axial direction, or optionally the cross section may be rectangular or otherwise elongated in which case one dimension may be advantageously substantially larger than the other, while the resilient member may be of substantially uniform thickness between the outer and inner members, or optionally the resilient member may taper in thickness in the axial direction between the outer and inner members.

Preferably the resilient member is in a state of compressive stress at least in a direction substantially normal to the given axial direction.

According to the invention an hydraulic system includes a reciprocatable device of the kind described herein, a source of substantially constant fluid pressure and a two-position valve arranged so that when the valve is in a first position fluid under pressure can be admitted through the valve to the device from said source so as to move the inner member of said device in a first sense in the given axial direction relative to the outer member and when the valve is in a second position fluid can be expelled therethrough from the device by the action of the resilient member moving the inner member in the reverse sense.

An alternative hydraulic system includes a reciprocatable device of the kind described herein, a first pump provided with a first pressure relief valve, a non-return valve, a second pressure relief valve arranged to open at a higher fluid pressure than the first pressure relief valve and a second pump, arranged so that the first pump can apply a constant fluid pressure to the said device, said constant pressure being limited by the first pressure relief valve, the second pump applying a pulsating fluid pressure to the device so as to move the inner member in an oscillating manner relative to the outer member, the pulsating fluid pressure being limited by the second pressure relief valve, the non-return valve being arranged in fluid circuit between the first and second pressure relief valves so that fluid can pass from the first pump to the reciprocatable device but not in the reverse sense.

Reciprocatable devices according to the invention find particular application in earth cutting and like equipment in which a cutting tool is driven into abrasive or contaminating material which could damage or cause rapid wear in any driving machine parts. Reciprocatable devices according to the invention enable an earth cutting tool to be given a powerful forward thrusting movement without exposing its machine parts to the ingress of earth fragments.

The invention therefore particularly provides an earth cutting machine having a reciprocatable device according to the invention in which the inner member is provided with a cutting blade.

Preferably the earth cutting machine has a cutting blade driven by an hydraulic system of the kind described herein, and the hydraulic system may include means whereby the inner member of the reciprocatable device is arranged to move more rapidly in one axial sense than the other.

The invention will be further described, by way of example only, with reference to the accompanying drawings in which.

Figure 1:
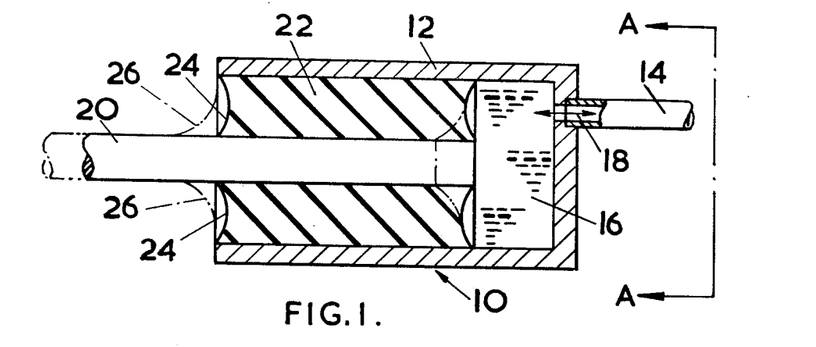
FIG. 1 is a sectional elevation of a reciprocatable device according to the invention.

Referring to FIG. 1, the device according to the invention is indicated generally by reference 10. The device comprises an outer member or shell 12 which is the analogue of the cylinder in a piston and cylinder reciprocatable device of conventional kind. The outer member is provided with a conduit or pipe 14 through which fluid can be conducted to and from the interior space 16 in the enclosure at the end of the outer member, as indicated by the double arrow 18. The inner member is in this example a rod, part of which is shown referenced 20 and is the analogue of a piston. Between the outer and inner members, and joining them, is the resilient member 22. The resilient member 22 is bonded in a fluid-tight manner to both the outer and inner members so that fluid in the space 16 cannot escape between these members.

In an unstressed condition, that is when the pressure in the space 16 is the same as that outside, the inner member and resilient member are in the undisplaced position shown by the full lines 24, but as pressure is built up in the space 16 the inner and resilient members move in the given axial direction towards a displaced position shown by the dotted lines 26. The limit of axial travel in the said given axial direction is fixed by the ultimate strength of the bond between the resilient member and the outer and inner members and the mechanical properties of the material of the resilient member. The resilient member acts as a seal between the outer and inner members and is completely free from leakage. It also acts as a return spring when sufficiently flexed so that when pressure in space 16 is reduced, fluid is forced out of the space and the member 20 moves inwards, i.e. to the right in the diagram.

The cross section, i.e. the end view in the direction of arrows A of the example of the device shown in FIG. 1 is circular but it is not essential that this be so. If circumstances should demand, the device may be constructed with a triangular, square, rectangular, polygonal, elliptical or irregular cross section, so long as the resilient member 22 can be reliably bonded to the outer and inner members 12 and 20.

Figure 2:
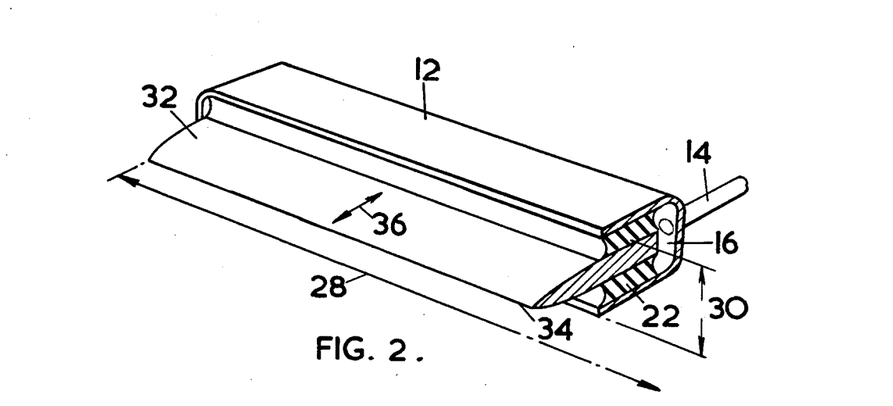
FIG. 2 is a trimetric view, partly in section, of a reciprocatable device having a rectangular cross section in which one dimension is substantially larger than the other.

FIG. 2 illustrates part of another example of a device according to the invention. In this example the cross section instead of being circular is rectangular with one dimension, indicated by the arrows 28, substantially larger than the other, indicated by the arrows 30. The outer member 12 is an elongated box and the interior space 16 in the enclosure is provided, as in the former example, with a pipe 14 for access of fluid. The resilient member 22 in this example is in the form of elongated slabs and is bonded as before to the outer member 12 and to the inner member 32 in a sandwich construction. The inner member 32 is shown as being flat and elongated and shaped as a cutting blade to the edge 34. This embodiment is of particular value in earth cutting machinery. The device can be substituted for the fixed cutting blade on, for example, a scraper or bulldozer when the ratio of dimension 28 to dimension 30 may be 10 to 20 or even greater. When the edge 34 of inner member 32 is then presented to a mass of earth or the like which is to be cut, oscillation of member 32 axially, as indicated by the arrows 36, assists penetration of the earth.

Figures 4, 4A, 5:
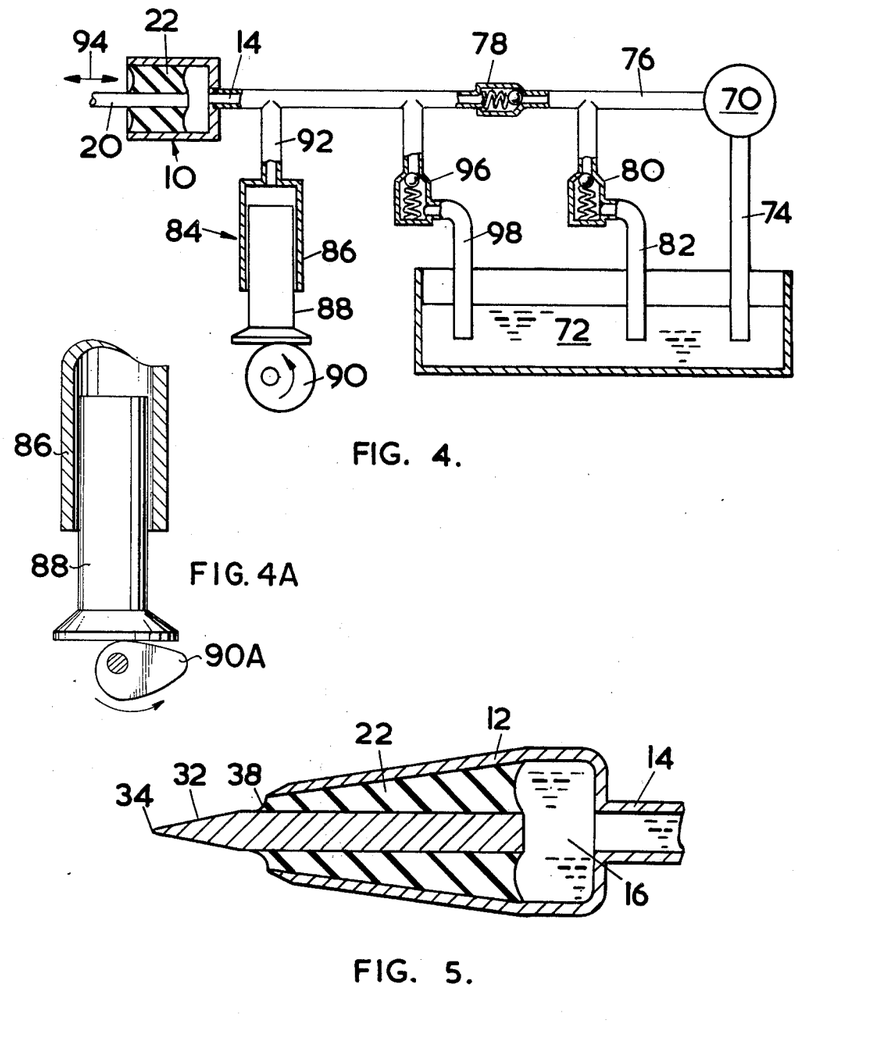
FIG. 4 is a diagrammatic illustration of another form of hydraulic system according to the invention.
FIG. 4A is a fragmentary diagrammatic view of a modification of the device illustrated in FIG. 4.
FIG. 5 is a cross section of an alternative to the embodiment of FIG. 2.

FIG. 5 shows a cross section of an alternative to the embodiment of FIG. 2. In this the outer member 12 and the resilient member 22 are tapered as shown so that there is less resistance to penetration of the earth by the device due to the change of section at 38.

As another alternative, not illustrated, an earth cutting blade, in itself of conventional pattern, may be oscillated by a plurality of devices of the kind shown in FIG. 1, the blade being attached to the inner members 20 of the devices and the outer members 12 thereof being fixed to an abutment on a part of an earth cutting machine.

Figure 3:
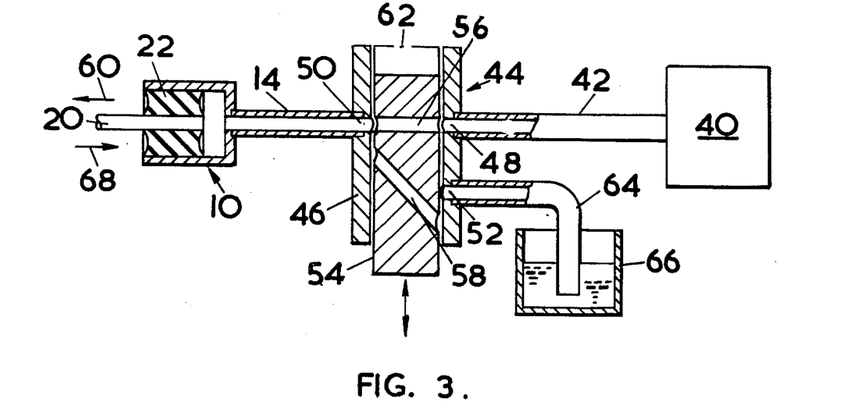
FIG. 3 is a diagrammatic illustration of one form of hydraulic system according to the invention.

FIG. 3 illustrates diagrammatically one form of hydraulic system for actuating a device according to the invention. A source of substantially constant fluid pressure is represented by 40. Fluid under pressure is conducted from 40 through a pipe 42 to an hydraulic valve, indicated generally by 44. The valve comprises a body or cylinder 46 provided with ports 48, 50, 52 and a well fitting piston 54 provided with transverse passages 56, 58 which can coact with the aforementioned ports. With the valve in the first position as shown in FIG. 3, fluid under pressure can gain access to the device 10 through passage 56, port 50 and pipe 14, so as to drive the inner member 20 in a first, or outward sense, in the axial direction as indicated by the arrow 60. When the valve is moved to a second position indicated by the dotted outline 62, fluid from supply 40 is cut off and device 10 is connected through pipe 14, port 50, passage 58 and port 52 to a pipe 64, which discharges fluid into a reservoir 66 when the inner member 20 moves in the sense of the arrow 68 by the action of the resilient member 22. If the valve is moved between the two indicated positions with a regular frequency, preferably with a short dwell at each extreme, the inner member 20 will oscillate at that frequency as indicated by the arrows 60, 68.

FIG. 4 illustrates an alternative hydraulic system for actuating a device according to the invention. A first pump 70 can draw fluid from a reservoir 72 through a pipe 74, and supply the fluid at pressure through the pipes 76 and 14 to device 10. Pipes 76 and 14 are in communication with one another through a non-return valve 78 which prevents fluid from flowing back to pump 70. A first relief valve 80, which is adjustable, allows the pressure developed in device 10 by the pump 70 to be limited and excess fluid is returned through the pipe 82 to reservoir 72. The pump 70 is of such a kind, e.g., a gear pump that the fluid pressure it supplies to the device 10 is substantially constant, and constancy of pressure may be assisted if desired by the provision of some form of hydraulic accumulator (not illustrated) connected to the pipe 76.

In the modification of the hydraulic system of FIG. 4, pressure is also supplied to the device 10 through the pipes 92 and 14 by a second pump 84 comprising a cylinder 86 and a piston 88 driven by a rotatable cam 90. The pressure provided by the second pump 84 is of an oscillating nature and is superimposed on the constant pressure provided by the first pump 70. Thus the inner member 20 of the device 10 is made to oscillate axially, as shown by the arrows 94. The initial position of the member 20, with the pump 84 not in operation, can be varied by adjustment of the first relief valve 80 and by raising the pressure applied by the pump 70 causing the initial position of inner member 20 to be displaced to the left as seen in FIG. 4. With the pump 84 operating, the extreme movement of the inner member 20 can be limited by means of a second adjustable relief valve 96 which permits fluid at excess pressure to flow from pipe 14 through pipe 98 to reservoir 72.

With the shape of the cam 90 as shown in FIG. 4 the inner member 20 would move with approximately simple harmonic motion. Provision can be made for changing the cam 90 for another or different profile which would give to the inner member 20, for example, a rapid outward and slower return motion. The cam 90A of FIG. 4A may be used for this purpose. In earth cutting machinery a very rapid outward motion, amounting substantially to impact conditions, might prove desirable for some soils or rocks, in which case a cam having a very sharp rise would be required.

Figure 6:
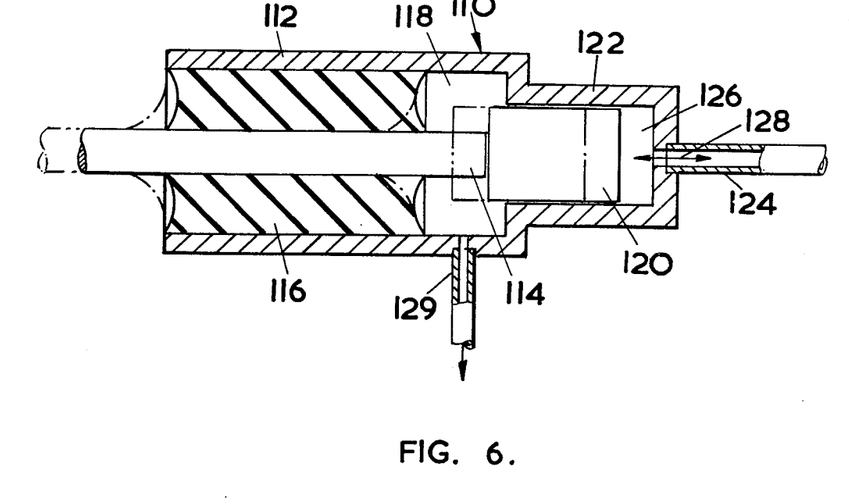
FIG. 6 is a cross section of a reciprocatable device which includes a piston.

FIG. 6 illustrates an embodiment of the device in which a piston applies force from pressurized fluid to the inner member of the device. The device is indicated generally be reference 110. The device comprises an outer member or shell 112 and an inner member which is a rod, part of which is shown referenced 114. The inner and outer members are joined by a resilient member 116 bonded to both the inner end and outer members. The interior space 118 between the inner and outer members is connected to the atmosphere through passage 129 and if necessary to an oil drain to remove any small quantity of oil which may leak into the space 118.

The inner member 114 is in end-to-end contact with a piston 120 which closely fits in an extension 122 of the outer member 112. The extension 122 is provided with a conduit or pipe 124 through which fluid can be conducted as indicated by the double arrow 128, to and from the interior space 126, i.e. the enclosure of the extension 122 between the piston 120 and the pipe 124. The piston is arranged to fit so that substantially no fluid can escape between the piston 120 and the extension 122 in use.

When pressure is built up in the enclosure 126, the piston 120 and inner member 114 move to the left in the figure to an axially displaced position in relation to the outer member 112, and the resilient member 116 is distorted, as shown by the dotted lines. When the pressure is released, the inner member, resilient member and piston return to the undisplaced position shown by the full lines, the resilient member acting as a return spring to keep the inner member 114 and the piston 120 in contact. In an alternative construction the member 114 and piston 120 may be rigidly joined.

It is an advantage of this embodiment that a higher pressure may be applied to the piston and hence to the inner member than is possible with the embodiments already described herein, thereby allowing smaller pressure generators and smaller pipes to supply a reciprocatable device of similar power which can therefore be more compact, while allowing the resilient member to carry substantially all of the transverse load as well as acting as a return spring. Conversely the piston, when reciprocated, may apply a higher pressure to the fluid.

The inner and outer members of the device are desirably made of mild steel and the resilient member of natural rubber. Natural rubber is preferred because it displays low hysteresis and hence has little tendency to heat up, with consequent deterioration of properties, when oscillated at a high frequency. A preferred fluid for operating the device is a conventional hydraulic oil. If this is used the surface of the natural rubber resilient member facing the oil must be protected from contact with it, for example by a bonded-on coating of an oil resistant elastomer of substantially similar mechanical properties to those of the resilient member.

The embodiment of the invention shown in FIG. 1 can be manufactured by bonding the resilient member 22 to the outer and inner members 12 and 20 by a usual rubber-to-metal bonding technique, and then swaging down the outside diameter of the outer member by approximately 10% of the initial diameter. This treatment places the resilient member in a state of radial (or substantially normal to the given axial direction) compressive stress and it is found to give the device improved mechanical properties compared with one in which such compression has not been produced.

Analogous treatment may be applied to the embodiments shown in FIGS. 2 and 5 with approximately a 10% reduction in the initial dimension 30 (FIG. 2) of the outer member 12. In these embodiments the inner member 32 may be constructed with the portion comprising the edge 34 made of some harder and more abrasion-resisting material than the rest of the member, e.g. tool steel or tungsten carbide.

The invention has been described with reference to embodiments in which fluid pressure is converted to mechanical movement, but the invention may equally be applied to the conversion of mechanical movement to the displacement of fluid; i.e. the device may be employed as a pump. A device according to the invention, as shown in FIG. 1, could be substituted for the conventional pump 84 shown in FIG. 4.

The piston and cylinder arrangement illustrated in FIG. 6 can be constructed on conventional principles allowing for the possibility of impact forces being generated between the piston 120 and the inner member 114.

It has been found as a result of tests that the most favorable embodiments of the invention are those in which the resilient member is of substantially uniform thickness between the outer and inner members of the device. Where the resilient member is tapered in thickness only a reduced displacement of the inner member is obtainable without the risk of initiating cracks in the resilient member.

Tests have further shown that a usefully long working life for a device according to the invention is most easily achieved by the use of soft rubber (about 0.5 $MN/m^2$ nominal shear strength) for the resilient member, life being in general reduced as the hardness of the rubber is increased. The maximum strain applied to the resilient member is preferably restricted to less than 40%, i.e. a strain amplitude of less than 20%.

The inner and outer members of the reciprocatable device have been described as being connected by a resilient member so as to form a seal between them. Normally the connection is made so as to provide a complete seal between inner and outer members. In some circumstances however a complete and perfect seal may not be necessary or even most desirable and the scope of the invention includes also the case in which the seal is not absolute, provided it is sufficient to maintain at an acceptably low level, for the fluid pressure concerned the ingress of foreign matter, such as abrasive dust, into the device and the escape of fluid from the device. In the embodiment which includes a piston as well as the resilient member the requirements of either one of those elements can be relaxed without disadvantage. If the resilient member provides a complete seal a moderate leakage past the piston can be accepted and the piston need not be lapped in to a close sliding fit with very fine tolerances. On the other hand, if the piston is a close sliding fit the resilient member need not make a complete seal. Thus as used in this specification the term "seal" means a seal sufficiently good to maintain at an acceptably low level the passage of material across it.

Figure 7A:
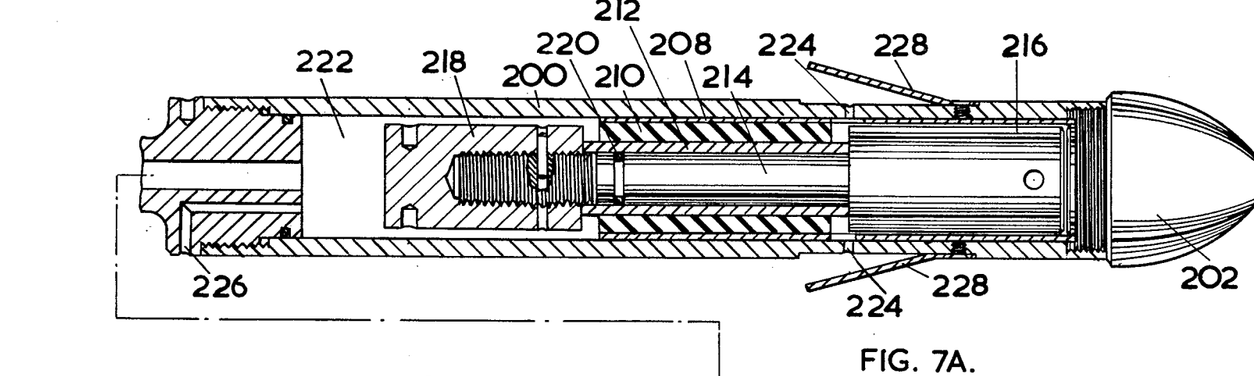
FIGS. 7A and 7B are cross sectional elevations of an earth piercing apparatus including a reciprocatable device according to the invention and FIG. 8 is a diagrammatic illustration of an earth cutting machine including a reciprocatable device according to the invention.
Figure 7B:
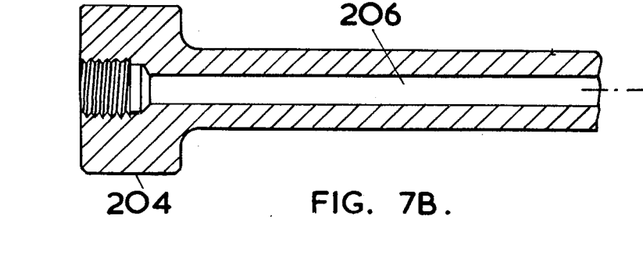

FIGS. 7 A & B illustrate one example of an application of a reciprocatable device according to the invention, 7B being the continuation of 7A to the left in the Figure. The device is here employed in an earth piercing apparatus which is capable of making a cylindrical bore through earth for the purpose of laying, e.g., a telephone cable in a situation where the digging of a trench is not feasible.

The apparatus has a cylindrical body 200 to which is attached, at what is the leading end in use, the piercing head 202; and at the trailing end a tail portion 204. Hydraulic power is supplied to the apparatus through a passage 206 and a flexible pipe (not shown) from a source such as that illustrated in FIG. 3 or FIG. 4. The outer member 208 of the reciprocatable device is fixed in the body 200 of the apparatus; 210 is the resilient member and 212 the inner member, being hollow cylindrical in this instance. Through the inner member is arranged a shaft 214, carrying at each end similar cylindrical blocks 216, 218, which clear the interior of the body 200. The groove and packing ring indicated at 220 prevent the passage of any appreciable quantity of hydraulic liquid past the reciprocatable device from the chamber 222, and any which does get past can escape through the holes 224 in the body 200.

In use, the chamber 222 is filled with hydraulic liquid through the passage 206, all air being bled away through the sealable passage 226. When pulses of hydraulic pressure are applied to the liquid in 222 the reciprocatable device vibrates the masses 216 and 218 in a longitudinal direction, causing the whole apparatus also to vibrate in the same direction. If the apparatus is introduced, piercing head first, into a bore in earth the piercing head 202 is driven into the earth ahead of it and withdrawal is opposed by the outwardly urged sprags 228. If the cylindrical block 216 is so spaced from the head 202 as to strike the latter when the apparatus is in operation the apparatus can move forward without the use of the sprags 228. This is of advantage if it is required to withdraw the apparatus from a blind bore.

The hydraulically operated earth piercing apparatus just described has advantages over the usual pneumatically operated kind in that it is extremely simple, containing no valve gear; it requires no exhaust, as the power supply is pulsating, and only one power supply line is needed; and for a given power an hydraulic power supply line can be appreciably smaller than the equivalent pneumatic line.

The earth piercing apparatus illustrated in FIGS. 7 A & B is, as constructed, about 650 mm in length and about 70 mm in diameter.

Figure 8:
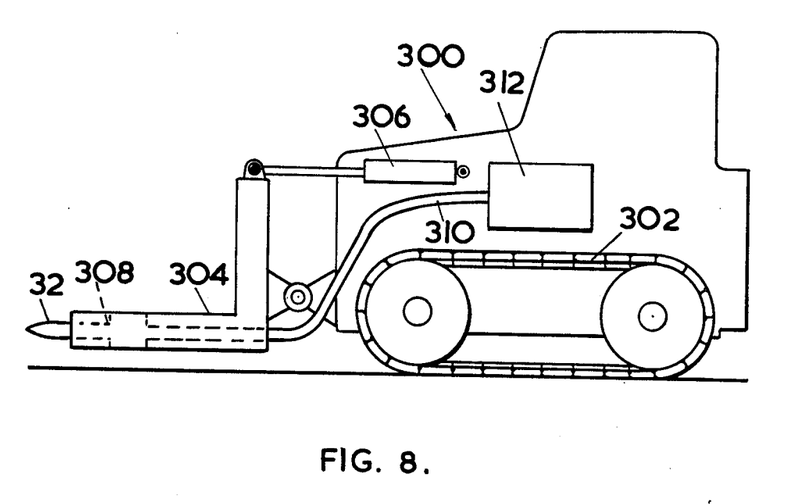

An earth cutting machine including a reciprocatable device according to the invention is illustrated diagrammatically in FIG. 8. The machine, indicated generally by 300, is mounted on crawler tracks 302. The machine has a cutting assembly 304, positionable by conventional hydraulic means 306. The cutting assembly is provided with a cutting blade 32, driven by a reciprocatable device 308 of the kind illustrated in FIG. 2. The said device is supplied through a pipe 310 from an hydraulic system 312 of the kind illustrated in FIG. 3 or in FIG. 4 for example. In use, axial vibration of the blade 32 assists penetration of the cutting assembly 304 into earth. The cutting blade has been described as being driven by a reciprocatable device of the kind illustrated in FIG. 2. It would also be feasible to drive the blade with a plurality of devices of the kind illustrated in FIG. 1.

What I claim is:

1. A hydraulic system having a reciprocatable device comprising an outer member, an inner member which can be reciprocated relative to the outer member in a given axial direction, and a resilient member connecting said outer and inner members so as to form a seal therebetween, an end of the outer member forming an enclosure which can contain pressurized fluid through which force can be applied to the inner member to move said inner member in said axial direction relative to the outer member while flexing the resilient member, the average thickness of the resilient member in a direction normal to the axial direction being not greater than the average length of said resilient member in said axial direction and a piston which is a close sliding fit in the end of the said outer member, said piston being arranged so that it can apply force from pressurized fluid when in the enclosure to the inner member of the device.

2. A fluid operating reciprocating device comprising a housing having an open end and an opposite closed end, means for introducing fluid under pressure into the housing adjacent to the closed end, a rod coaxial with the longitudinal axis of the housing and having one end facing the closed end of the housing and in spaced relationship therewith and an opposite end outside the housing, a resilient member about the rod and within the housing forming a fluid tight seal with the housing and with the rod, said resilient member having one end which terminates near that end of the rod, which is within the housing, a piston disposed between the last said end of the resilient member and the closed end of the housing, the average thickness of the resilient member in a direction normal to the longitudinal axis of the rod being not greater than the average length of the resilient member, said resilient member being adapted to flex with changes in fluid pressure in the space between its said end and the closed end of the housing.

3. An hydraulic system including a reciprocatable device according to claim 1 comprising, a source of substantially constant fluid pressure and a two position valve, arranged so that when the valve is in a first position fluid under pressure can be admitted through the valve to the device from said source so as to move the inner member of said device in a first sense in the given axial direction relative to the outer member, and when the valve is in a second position fluid can be expelled therethrough from the device by the action of the resilient member moving the inner member in the reverse sense.

4. An hydraulic system including a reciprocatable device according to claim 1 comprising, a first pump provided with a first pressure relief valve, a non-return valve, a second pressure relief valve arranged to open at a higher fluid pressure than the first pressure relief valve and a second pump, arranged so that the first pump can supply a constant fluid pressure to the said device, said constant fluid pressure being limited by the first pressure relief valve, the second pump applying a pulsating fluid pressure to the said device so as to move the inner member in an oscillating manner relative to the outer member, the pulsating fluid pressure being limited by the second pressure relief valve, the non-return valve being arranged in fluid circuit between the first and second pressure relief valves so that fluid can pass from the first pump to the reciprocatable device but not in the reverse sense.

5. An earth cutting machine including a cutting blade driven by an hydraulic system according to claim 1.

6. An earth cutting machine in which the hydraulic system of claim 1 includes means whereby the inner member of the reciprocatable device is arranged to move more rapidly in one axial sense than in the other axial sense.

7. A reciprocatable device according to claim 1 further comprising an earth cutting machine including a cutting blade driven by said hydraulic system.

8. A hydraulic system according to claim 1 which includes means whereby the inner member of the reciprocatable device is arranged to move more rapidly in one axial sense than in the other axial sense.

* * * * *